United States Patent
Buragohain et al.

(10) Patent No.: US 8,516,210 B2
(45) Date of Patent: Aug. 20, 2013

(54) APPLICATION CONSISTENT SNAPSHOTS OF A SHARED VOLUME

(75) Inventors: Joydeep Buragohain, Issaquah, WA (US); Vinod R. Shankar, Woodinville, WA (US); Andrea D'Amato, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/333,722

(22) Filed: Dec. 21, 2011

(65) Prior Publication Data

US 2013/0166863 A1    Jun. 27, 2013

(51) Int. Cl.
*G06F 12/00* (2006.01)

(52) U.S. Cl.
USPC ........................................ 711/162

(58) Field of Classification Search
None
See application file for complete search history.

(56) References Cited

U.S. PATENT DOCUMENTS

| | | | |
|---|---|---|---|
| 6,014,669 A * | 1/2000 | Slaughter et al. | 707/610 |
| 6,154,852 A | 11/2000 | Amundson et al. | |
| 6,549,921 B1 | 4/2003 | Ofek | |
| 6,708,227 B1 | 3/2004 | Cabrera et al. | |
| 6,952,741 B1 | 10/2005 | Bartlett et al. | |
| 7,231,461 B2 | 6/2007 | Laschkewitsch et al. | |
| 7,475,296 B2 * | 1/2009 | Rao et al. | 714/100 |
| 7,685,459 B1 | 3/2010 | De Spiegeleer et al. | |
| 7,809,907 B2 | 10/2010 | Uratani et al. | |
| 7,836,161 B2 | 11/2010 | Scheid | |
| 7,900,002 B2 | 3/2011 | Lyon | |
| 8,296,532 B2 * | 10/2012 | Ben-Dor et al. | 711/156 |
| 2006/0206677 A1 | 9/2006 | Kim et al. | |
| 2011/0082832 A1 | 4/2011 | Vadali et al. | |
| 2011/0252208 A1 | 10/2011 | Ali et al. | |

OTHER PUBLICATIONS

"Backup & Recovery", Retrieved on: Sep. 1, 2011, Available at: http://www.vmware.com/technical-resources/high-availability/virtualization-backup.html.

* cited by examiner

*Primary Examiner* — Hiep Nguyen
(74) *Attorney, Agent, or Firm* — Workman Nydegger (57) ABSTRACT

The present invention extends to methods, systems, and computer program products for creating a snapshot of a shared volume that is application consistent across various nodes of a cluster. The invention enables a snapshot of a volume to be initiated on one node which causes all applications in the cluster that use the volume to persist their data to the volume prior to the snapshot being created. Accordingly, the snapshot is application consistent to all applications in the cluster that use the volume. The invention also enables applications on various nodes to perform post snapshot processing on the created snapshot. The invention can be used in an existing backup system that is not cluster aware to enable the existing backup system to create application consistent snapshots of a volume shared by applications across multiple nodes of a cluster.

20 Claims, 6 Drawing Sheets

501 — Receive A Request, From A Backup Application, At A Backup Coordinator On A First Node, The Request Requesting That A Snapshot Be Created Of A Shared Volume Used By At Least One Application On The First Node And By At Least One Application On At Least One Other Node In The Cluster, Each Of The At Least One Application On The First Node And On The At Least One Other Node Including A Writer, And Wherein Each Of The First Node And The At Least One Other Node Also Includes A Cluster Writer And A Cluster Service 502 — Send, By The Backup Coordinator, A Freeze Command To The Cluster Writer And Each Writer On The First Node, The Freeze Command Instructing The Cluster Writer And Each Writer On The First Node To Persist Application Data To The Shared Volume 503 — Send, By The Cluster Writer On The First Node, A Notification Of The Freeze Command To The Cluster Service On The First Node 504 — Send, By The Cluster Service On The First Node, A Notification Of The Freeze Command To The Cluster Service On Each Of The At Least One Other Node, The Notification Instructing The Cluster Service On Each Of The At Least One Other Node To Initiate A Backup Process Of The Shared Volume On Each Of The At Least One Other Node 505 — Wait, By The Cluster Writer On The First Node, For A Notification From The Cluster Service On Each Of The At Least One Other Node Prior To Returning From The Freeze Command, The Notification Indicating That Each Writer On The Corresponding Node Has Persisted Corresponding Application Data To The Shared Volume 506 — Upon Receiving The Notification From The Cluster Service On Each Of The At Least One Other Node, Return, By The Cluster Writer On The First Node, From The Freeze Command 507 — Upon The Cluster Writer On The First Node Returning From The Freeze Command, Send, By The Backup Coordinator, A Request To The Storage Provider, The Request Causing The Storage Provider To Create A Snapshot Of The Shared Volume, The Snapshot Having Application Consistency To Each Application On The First Node And The At Least One Other Node That Uses The Shared Volume.

601
Receive A Notification, At A Cluster Service On The First Node, That A Backup Process Of A Shared Volume Has Been Initiated On A Second Node In The Cluster, The Shared Volume Being Used By At Least One Application On Each Of The First And Second Nodes, The Notification Being Received From A Cluster Service On The Second Node And Indicating That A Freeze Command Was Received By A Cluster Writer On The Second Node

602
Send, By The Cluster Service On The First Node, A Request To A Backup Coordinator On The First Node, The Request Requesting That A Snapshot Be Created Of The Shared Volume

603
Send, By The Backup Coordinator, A Freeze Command To A Cluster Writer And A Writer Of The At Least One Application On The First Node, The Freeze Command Instructing The Cluster Writer And The At Least One Writer To Persist Application Data To The Shared Volume

604
After The Cluster Writer And The At Least One Writer Return From The Freeze Command, Send, By The Backup Coordinator, A Commit Command To A Helper Provider On The First Node

605
Send, By The Helper Provider On The First Node, A Notification Of The Commit Command To The Cluster Service On The First Node, Wherein The Helper Provider Blocks On The Commit Command

606
Send, By The Cluster Service On The First Node, A Notification To The Cluster Writer On The Second Node That The Commit Command Has Been Received Thus Indicating That Each Writer On The First Node Has Persisted The Data Of The Corresponding Application To The Shared Volume

*Figure 6*

APPLICATION CONSISTENT SNAPSHOTS OF A SHARED VOLUME

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

It is becoming more and more common to host applications within a distributed environment. For example, applications are often hosted on a node (e.g. a server) of a cluster of nodes. In the cluster, different applications can be hosted on different nodes but may each have access to one or more common storage volumes. In other words, one storage may be accessed by many different applications spread across various nodes of the cluster.

Figure 1:
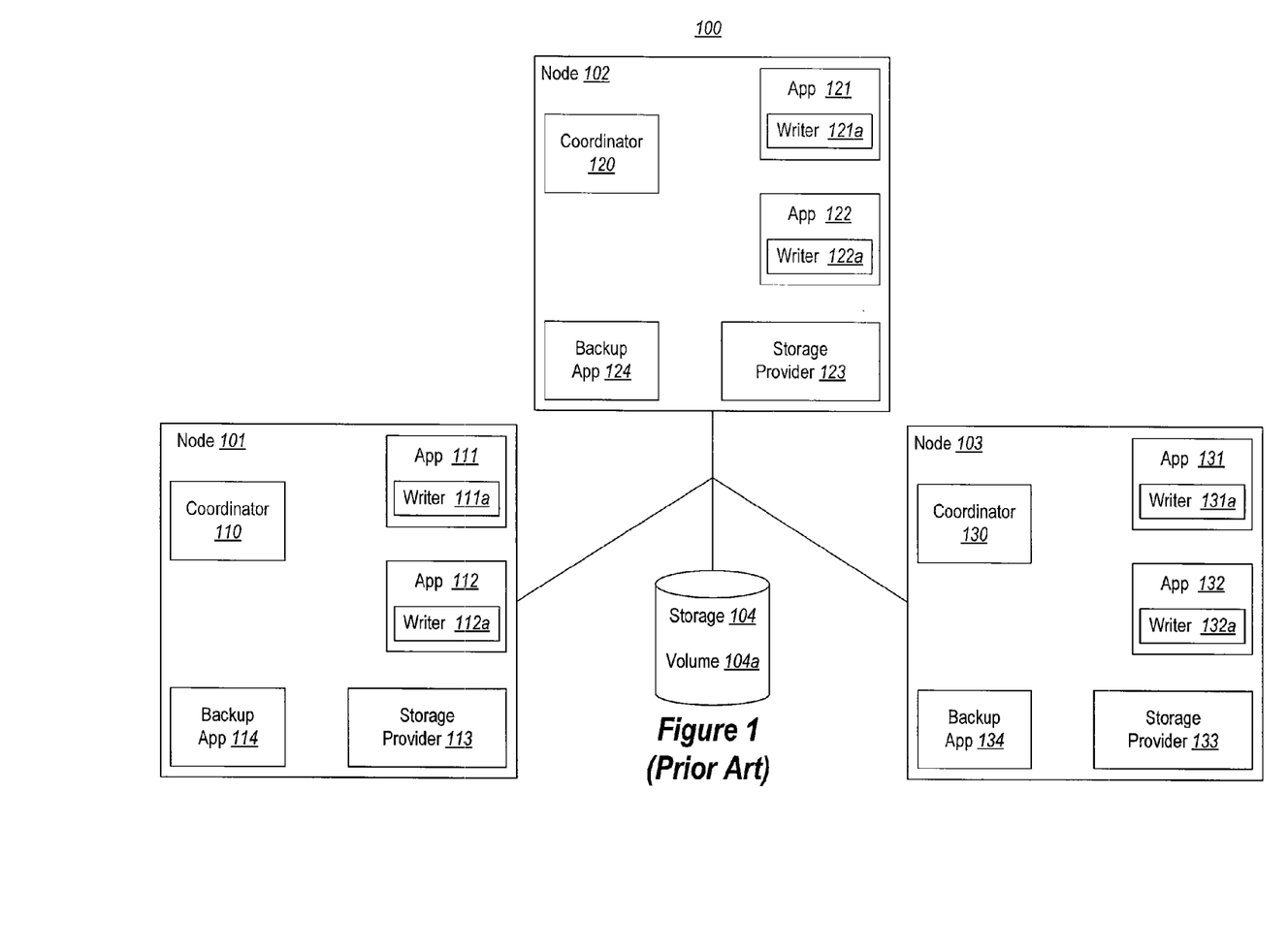
FIG. 1 illustrates an exemplary cluster of nodes having components of a prior art backup system.

FIG. 1 depicts this type of environment. As shown, a cluster 100 includes nodes 101-103. In this exemplary cluster, each node includes a coordinator, a backup application, a storage provider, and two applications. However, a node can include any number of applications as well as multiple storage providers. In this example, each application uses volume 104a on storage 104 to store data.

The components depicted in FIG. 1 represent a prior art backup system that has been used to perform backups in cluster as well as non-cluster environments. Microsoft's Volume Shadow Copy Service (VSS) is an example of a coordinator that can be used in this type of backup system. In this backup system, coordinators 110-130 are used to coordinate backups of shared volumes such as volume 104a. This backup can comprise a point-in-time image (i.e. snapshot) of volume 104a. Although the creation of a snapshot will be described as occurring on node 101, similar steps can be carried out on each node to create a snapshot of volume 104a on the node. In other words, each coordinator on nodes 101-103 functions similarly to create snapshots of a volume.

To create a snapshot on node 101, backup application 114 sends a request to coordinator 110 to create a snapshot. In this request, backup application 114 specifies a storage provider (in this example, storage provider 113) that should be used to create the snapshot. Coordinator 110 communicates with the writer of each application on node 101 (writers 111a and 112a) instructing them to prepare for a snapshot. This communication is referred to as a freeze command.

Such preparation includes flushing in-memory cache to disk and suspending (i.e. freezing) writes by the application until the snapshot is created. In this way, each writer ensures that all application data is persisted to volume 104a before a snapshot is created. Once each writer has returned from the freeze command, coordinator 110 instructs volume 104a to prepare for the snapshot such as by persisting file system metadata to volume 104a and suspending writes to volume 104a. This communication is referred to as a flush and hold command.

Once volume 104a has returned from the flush and hold command, coordinator 110 instructs storage provider 113 to create the snapshot of volume 104a. This is referred to as a commit command. Although one storage provider is shown, a node may employ multiple storage providers such as a hardware storage provider for interfacing directly with a hardware controller for storage 104, or a software storage provider for interfacing with an operating system (e.g. the file system). For purposes of the present invention, the type of storage provider used to create a snapshot is not important.

Storage provider 113 creates a snapshot of volume 104a. This snapshot is a copy of the contents of volume 104a as they existed at a single point-in-time (e.g. the point-in-time after each writer has persisted the data of each application on node 101 to volume 104a and volume 104a has flushed its cache). Once this snapshot is created and storage provider 113 returns from the commit command, coordinator 110 instructs volume 104a that it can recommence processing (referred to as a release command), and then instructs each writer that the applications can recommence writing to volume 104a (referred to as a thaw command). As can be seen, this backup process allows the applications to continue executing during the creation of the snapshot. The applications are only prevented from writing to volume 104a between the receipt of the freeze and thaw commands. However, the applications can continue to read volume 104a during this time.

This backup process produces a point-in-time snapshot of volume 104a that has file system consistency because the flush and hold command causes all file system data to be persisted before the snapshot is created. The point-in-time snapshot also has application consistency to each application running on the node where the snapshot was initiated, which in this example is node 101, because the freeze command causes each application to persist its data to volume 104a.

However, when this prior art backup process is used in a cluster environment, the point-in-time snapshot of volume 104a does not have application consistency to each application running on nodes 102 or 103. This is because coordinator 110 does not communicate with other nodes in the cluster (e.g. nodes 102 and 103). More specifically, this prior art backup system is not configured to allow a coordinator on one node to communicate with a coordinator or writers on another node. Accordingly, applications 121, 122, 131, and 132 will contain in-memory cache (or other non-persisted data) that was not persisted to volume 104a prior to the creation of the snapshot on node 101, and therefore, this non-persisted data will not be included in the snapshot.

Because of this, in this prior art backup system, to create a point-in-time snapshot for each application in the cluster, a user is forced to initiate a snapshot on each of the nodes in the cluster. For example, a user would use backup applications 124 and 134 on each of nodes 102 and 103 to communicate with coordinators 120 and 130 respectively to create separate point-in-time snapshots of volume 104a following the same process described above. This results in a separate snapshot being created on each node in the cluster.

BRIEF SUMMARY

The present invention extends to methods, systems, and computer program products for creating a snapshot of a shared volume that is application consistent across various nodes. The invention enables a snapshot of a volume to be initiated on one node which causes all applications in the cluster that use the volume to persist their data to the volume prior to the snapshot being created. Accordingly, the snapshot is application consistent to all applications in the cluster that use the volume. The invention also enables applications on the other nodes to perform post snapshot processing on the snapshot created on the node.

In one embodiment, a request is received at a backup coordinator on a first node of a cluster. The request is received from a backup application and requests that a snapshot be created of a shared volume used by at least one application on the first node and on at least one other node in the cluster. Each of the at least one application on the first and at least one other node includes a writer. Each of the first and at least one other node also includes a cluster writer.

The backup coordinator sends a freeze command to the cluster writer and each writer on the first node. The freeze command instructs the cluster writer and each writer on the first node to persist application data to the shared volume. The cluster writer on the first node then sends a notification of the freeze command to the cluster service on the first node. The cluster service on the first node sends a notification of the freeze command to the cluster service on each of the at least on other node. The notification instructs the cluster service on each of the at least one other node to initiate a backup process of the shared volume on each of the least one other node.

The cluster writer on the first node waits for a notification from the cluster service on each of the at least one other node prior to returning from the freeze command. This notification indicates that each writer on the corresponding node has persisted corresponding application data to the shared volume. Upon receiving the notification from the cluster service on each of the at last one other node, the cluster writer on the first node returns from the freeze command.

Once the cluster writer on the first node returns from the freeze command, the backup coordinator sends a request to a storage provider on the first node. The request causes the storage provider to create a snapshot of the shared volume. The snapshot has application consistency to each application on the first node and on the at least on other node that uses the shared volume.

In another embodiment, a notification is received at a cluster service on a first node. The notification indicates that a backup process of a shared volume has been initiated on a second node in the cluster. The shared volume is used by at least one application on each of the first and second nodes. The notification is received from a cluster service on the second node and indicates that a freeze command was received by a cluster writer on the second node.

The cluster service on the first node sends a request to a backup coordinator on the first node. The request requests that a snapshot be created of the shared volume. The backup coordinator sends a freeze command to the cluster writer and a writer of the at least one application on the first node. The freeze command instructs the cluster writer and the at least one writer to persist application data to the shared volume.

After the cluster writer and the at least one writer return from the freeze command, the backup coordinator sends a commit command to a helper provider on the first node. The helper provider on the first node sends a notification of the commit command to the cluster service on the first node. The helper provider blocks on the commit command. The cluster service on the first node then sends a notification to the cluster writer on the second node that the commit command has been received thus indicating that each writer on the first node has persisted the data of the corresponding application to the shared volume.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a flowchart of an example method for initiating the creation of a snapshot of a shared volume used by applications on multiple nodes in a cluster; and FIG. 6 illustrates a flowchart of an example method for responding to a notification that the creation of a snapshot of a shared volume has been initiated on another node of the cluster.

DETAILED DESCRIPTION

The present invention extends to methods, systems, and computer program products for creating a snapshot of a shared volume that is application consistent across various nodes. The invention enables a snapshot of a volume to be initiated on one node which causes all applications in the cluster that use the volume to persist their data to the volume prior to the snapshot being created. Accordingly, the snapshot is application consistent to all applications in the cluster that use the volume. The invention also enables applications on the other nodes to perform post snapshot processing on the snapshot created on the node.

In one embodiment, a request is received at a backup coordinator on a first node of a cluster. The request is received from a backup application and requests that a snapshot be created of a shared volume used by at least one application on the first node and on at least one other node in the cluster. Each of the at least one application on the first and at least one other node includes a writer. Each of the first and at least one other node also includes a cluster writer.

The backup coordinator sends a freeze command to the cluster writer and each writer on the first node. The freeze command instructs the cluster writer and each writer on the first node to persist application data to the shared volume. The cluster writer on the first node then sends a notification of the freeze command to the cluster service on the first node. The cluster service on the first node sends a notification of the freeze command to the cluster service on each of the at least on other node. The notification instructs the cluster service on each of the at least one other node to initiate a backup process of the shared volume on each of the least one other node.

The cluster writer on the first node waits for a notification from the cluster service on each of the at least one other node prior to returning from the freeze command. This notification indicates that each writer on the corresponding node has persisted corresponding application data to the shared volume. Upon receiving the notification from the cluster service on each of the at last one other node, the cluster writer on the first node returns from the freeze command.

Once the cluster writer on the first node returns from the freeze command, the backup coordinator sends a request to a storage provider on the first node. The request causes the storage provider to create a snapshot of the shared volume. The snapshot has application consistency to each application on the first node and on the at least on other node that uses the shared volume.

In another embodiment, a notification is received at a cluster service on a first node. The notification indicates that a backup process of a shared volume has been initiated on a second node in the cluster. The shared volume is used by at least one application on each of the first and second nodes. The notification is received from a cluster service on the second node and indicates that a freeze command was received by a cluster writer on the second node.

The cluster service on the first node sends a request to a backup coordinator on the first node. The request requests that a snapshot be created of the shared volume. The backup coordinator sends a freeze command to the cluster writer and a writer of the at least one application on the first node. The freeze command instructs the cluster writer and the at least one writer to persist application data to the shared volume.

After the cluster writer and the at least one writer return from the freeze command, the backup coordinator sends a commit command to a helper provider on the first node. The helper provider on the first node sends a notification of the commit command to the cluster service on the first node. The helper provider blocks on the commit command. The cluster service on the first node then sends a notification to the cluster writer on the second node that the commit command has been received thus indicating that each writer on the first node has persisted the data of the corresponding application to the shared volume.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
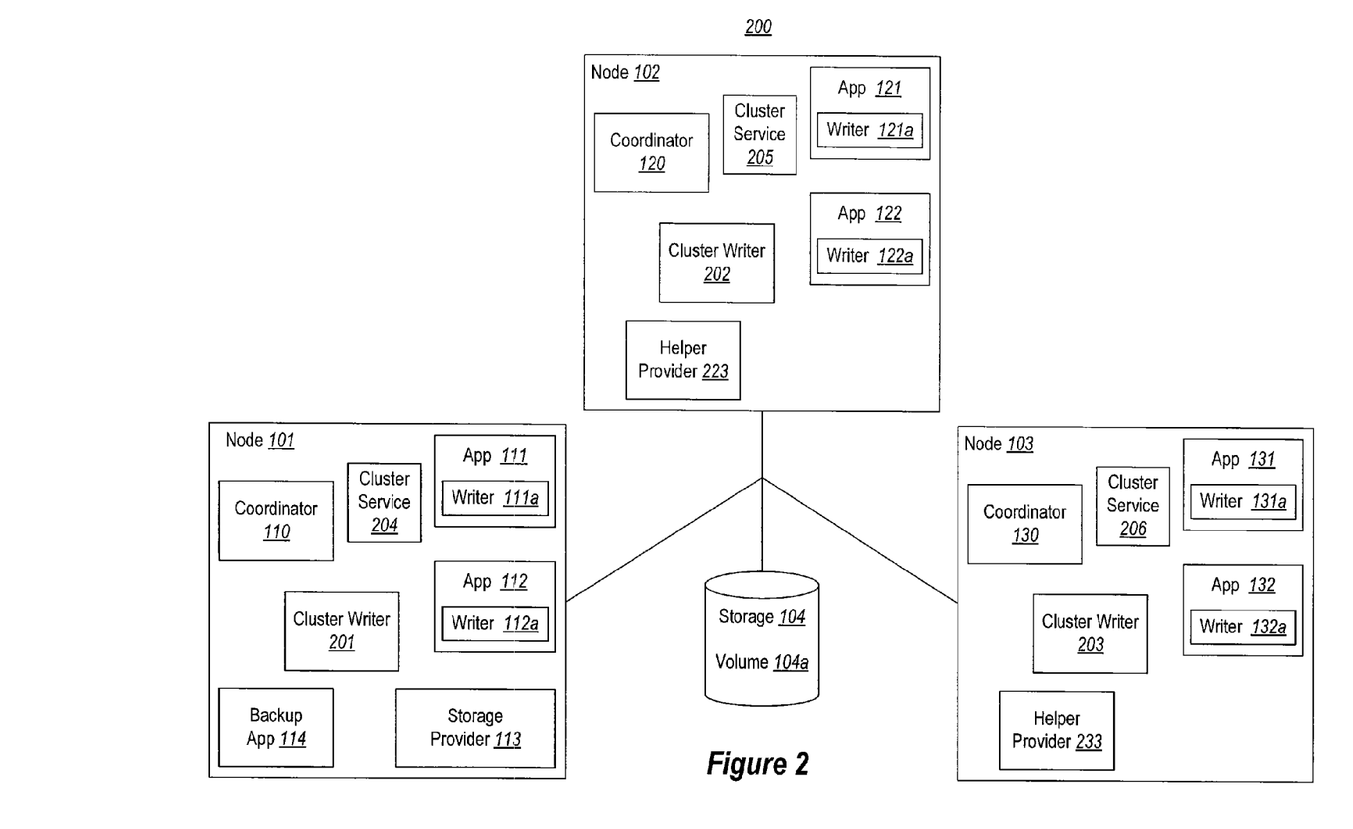
FIG. 2 illustrates an exemplary cluster of nodes having components of a backup system according to embodiments of the present invention.

FIG. 2 illustrates a cluster 200 that includes the same nodes as cluster 100 shown in FIG. 1. Each node in cluster 200 includes the same components except that backup applications 124 and 134 and storage providers 123 and 133 are not shown for clarity (although they could still exist on these nodes such as if it were desired to initiate backups from nodes 102 and 103). Further, each node is shown as including a cluster service and a cluster writer. These cluster services and cluster writers enable a snapshot of volume 104a to be created that is application consistent to all applications in cluster 200 that use volume 104a. The cluster services and cluster writers are configured to execute within the prior art backup system described in FIG. 1 to enable the prior art backup system to create cluster wide application consistent snapshots.

As described with respect to FIG. 1, backup application 114 can initiate the creation of a snapshot of volume 104a by communicating with coordinator 110. This communication includes specifying that storage provider 113 should be used to create the snapshot. In response to the request from backup application 114, coordinator 110 sends a freeze command to writers 111a and 112a as well as to cluster writer 201 (because cluster writer 201, like writers 111a and 112a, is registered with coordinator 110 as a writer).

Writers 111a and 112a respond to the freeze command as described above with respect to FIG. 1. However, in response to the freeze command, cluster writer 201 communicates with cluster service 204 on node 101 who then communicates with the cluster services on the other nodes of the cluster. Accordingly, a notification of the occurrence of the freeze command on node 101 is broadcast by cluster service 204 to cluster services 205 and 206.

After notifying cluster service 204 of the freeze command, cluster writer 201 waits (i.e. does not return from the freeze command) until it receives a response from each of cluster services 205 and 206. By waiting to respond to the freeze command, cluster writer 201 prevents coordinator 110 from proceeding with the backup process.

When a cluster service receives notification of the occurrence of a freeze command on another node in the cluster, the cluster service acts as a backup application to initiate the creation of a snapshot on the corresponding node. For example, when cluster service 205 receives the notification from cluster service 204, cluster service 205 will communicate with coordinator 120 to initiate the creation of a snapshot on node 102. Cluster service 205 specifies that helper provider 223 should be used to create the snapshot on node 102. Similarly, when cluster service 206 receives the notification from cluster service 204, cluster service 206 will communicate with coordinator 130 to initiate the creation of a snapshot on node 103. Cluster service 206 specifies that helper provider 233 should be used to create the snapshot on node 103.

As a result, coordinators 120 and 130 commence the creation of a snapshot on nodes 102 and 103 respectively by sending freeze commands to each writer on the node. For example, coordinator 120 sends a freeze command to writers 121a and 122a, as well as to cluster writer 202, while coordinator 130 sends a freeze command to writers 131a and 132a, as well as to cluster writer 203. As described with respect to FIG. 1, the freeze command causes each writer to prepare for the creation of a snapshot such as by persisting its in-memory data. Cluster writers 202 and 203 simply return from the freeze command.

After the writers on nodes 102 and 103 return from the freeze command, coordinators 120 and 130 send a flush and hold command to volume 104a. How these flush and hold commands are processed is not essential to the invention. For purposes of this invention, it is understood that these flush and hold commands from coordinators 120 and 130 are not ultimately routed to volume 104a (because a flush and hold command will be sent to volume 104a by coordinator 110 as described below).

Next, coordinators 120 and 130 send a commit command to helper providers 223 and 233 respectively (because helper providers 223 and 233 were specified in the respective requests to initiate a snapshot). Helper providers 223 and 233 respond to the commit command by blocking. In other words, helper providers 223 and 233 do not initially respond to coordinators 120 and 130. Additionally, helper providers 223 and 233 do not create a snapshot of volume 104a (as would be done if a storage provider were sent the commit command).

Instead, helper providers 223 and 233 notify cluster services 205 and 206 respectively of the commit command. In response, each of cluster services 205 and 206 notifies cluster writer 201. These notifications inform cluster writer 201 that the freeze command was successfully completed on each of nodes 102 and 103 thus indicating that the applications on nodes 102 and 103 have successfully persisted their data to volume 104a.

Because helper providers 223 and 233 block on the commit command, coordinators 120 and 130 will not send a release or a thaw command to volume 104a or the respective writers thus preventing the writers from modifying volume 104a until the snapshot has been created on node 101.

Once cluster writer 201 has received the notifications from cluster writers 202 and 203, cluster writer 201 returns from the freeze command (i.e. informs coordinator 110 that it has completed processing in response to the freeze command). Coordinator 110 then proceeds with the flush and hold command and the commit command, as described above, resulting in storage provider 113 creating a snapshot of volume 104a. This snapshot is application consistent to all applications in the cluster that use volume 104a because each application persisted its data to volume 104a prior to the snapshot being created.

Figure 3:
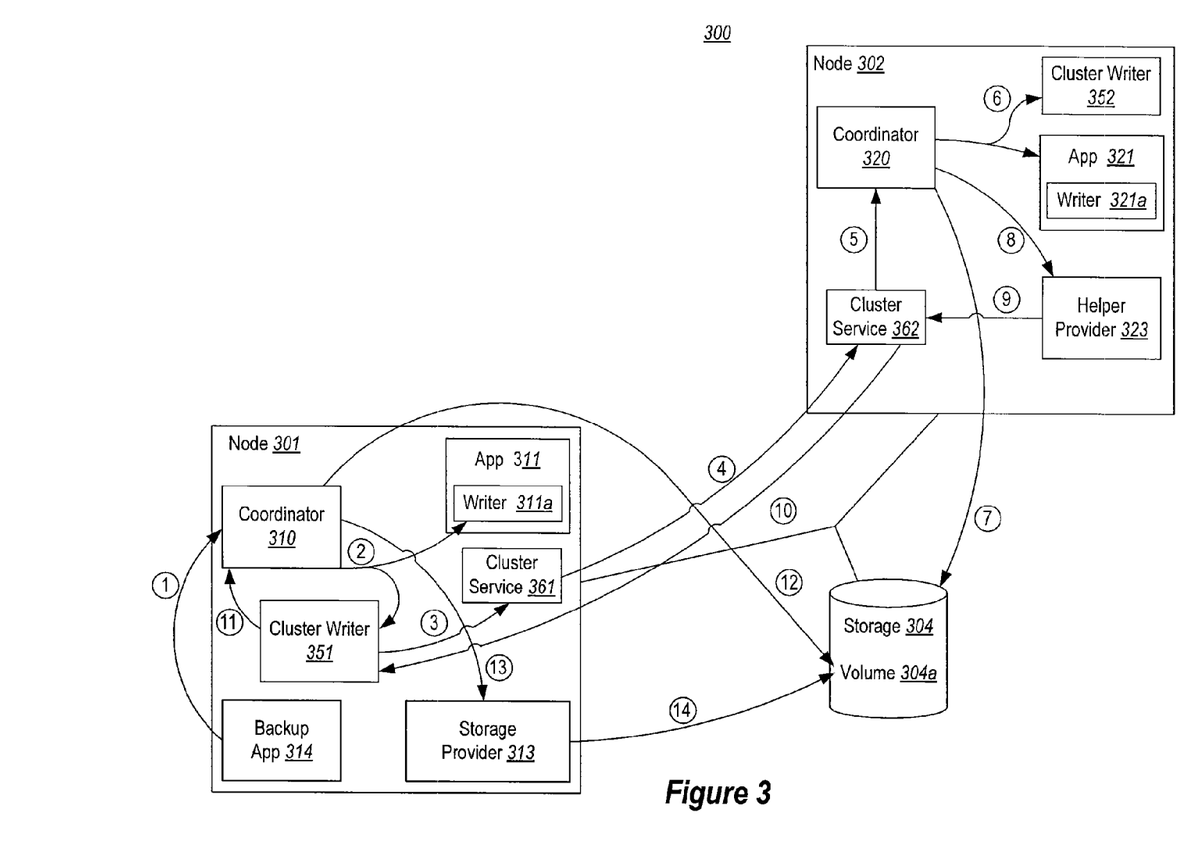
FIG. 3 illustrates an exemplary cluster of nodes showing a sequence of communications during a backup process.

FIG. 3 depicts another cluster 300. Cluster 300 is a simplified cluster (i.e. a subset of the components shown in cluster 200) that will be referred to to better describe the backup process employed by the present invention to create cluster wide application consistent snapshots. The following numbed steps correspond with the numbered arrows in FIG. 3.

(1) Backup application 314 requests that coordinator 310 initiate the creation of a snapshot of volume 304a using storage provider 313.

(2) Coordinator 310 sends a freeze command to writer 311a and cluster writer 351. Writer 311a processes the freeze command and returns at some point.

(3) Cluster writer 351 notifies cluster service 361 of the freeze command on node 301 and blocks.

(4) Cluster service 361 notifies cluster service 362 of the freeze command.

(5) Cluster service 362 requests that coordinator 320 initiate the creation of a snapshot of volume 304a using helper provider 323.

(6) Coordinator 320 sends a freeze command to writer 321a and cluster writer 352. Writer 321a processes the freeze command and returns at some point. Cluster writer 352 simply returns from the freeze command.

(7) Coordinator 320 sends a flush and hold command to volume 304*a*. The flush and hold command is processed without being sent to volume 304*a*.

(8) Coordinator 320 sends a commit command to helper provider 323.

(9) Helper provider 323 sends a notification of the commit command to cluster service 362 and blocks.

(10) Cluster service 362 notifies cluster writer 351 of the commit command.

(11) Cluster writer 351 returns from the freeze command.

(12) Coordinator 310 sends flush and hold command to volume 304*a*. Volume 304*a* processes the flush and hold command and returns.

(13) Coordinator 310 sends commit command to storage provider 313.

(14) Storage provider 313 creates a snapshot of volume 304*a*.

Returning again to FIG. 2, after the snapshot of volume 104*a* has been created, various additional steps are carried out to finish the backup process. After the snapshot is created, coordinator 110 sends a post snapshot command to at least some of the writers (e.g. a hypervisor writer and the cluster writer) to allow the writers to perform some minimal processing on the created snapshot prior to the snapshot being finalized (e.g. written to tape). This minimal processing is generally limited to modifications to an application's own data (e.g. rolling back a partially committed transaction).

When cluster writer 201 receives the post snapshot command, cluster writer 201 notifies cluster service 204 who then sends a notification of the post snapshot command to cluster services 205 and 206. Cluster writer 201 then waits until a response is received from each of cluster services 205 and 206 before returning from the post snapshot command. In this sense, cluster writer 201 handles the post snapshot command in much the same way as it handles the freeze command (i.e. by blocking).

The reason for notifying the other nodes of the post snapshot command is to allow the writers on the other nodes to perform post snapshot processing on the snapshot. Because the actual snapshot is located on node 101, a virtual snapshot is created on each of nodes 102 and 103. Commonly owned U.S. patent application Ser. No. 12/971,981, filed Dec. 17, 2010, titled BACKUP AND RESTORE OF DATA FROM ANY CLUSTER NODE, describes how virtual snapshots are used to perform post snapshot processing.

Upon receiving the notification of the post snapshot command, cluster services 205 and 206 then notify helper providers 223 and 233 respectively. Until this point, helper providers 223 and 233 have been blocking on the commit command. The notification that the post snapshot command was sent on node 101 indicates to helper providers 223 and 233 that they can return from the commit command.

Once helper providers 223 and 233 return from the commit command, coordinators 120 and 130 each send a post snapshot command to at least some of the writers on the respective node. In this way, each writer on each node is given the opportunity to perform additional processing on the created snapshot. As in the freeze command case, cluster writers 202 and 203 also receive the post snapshot command and simply return.

Once each writer on nodes 102 and 103 has returned from the post snapshot command, coordinators 120 and 130 can finish the backup process (e.g. by sending out a release and a thaw command), and then notify cluster services 205 and 206 respectively that the snapshot is complete. Cluster services 205 and 206 receive this notification because they are acting as the backup applications on nodes 102 and 103 (i.e. they initiated the backup process). Cluster services 205 and 206 then notify cluster writer 201 of the completion of the backup process on nodes 102 and 103.

Once cluster writer 201 has received the notification of the completion of the backup process on each of the other nodes, cluster writer 201 returns from the post snapshot command thus allowing coordinator 110 to finish the backup process on node 101 (e.g. by sending out a release and thaw command). Coordinator 110 then notifies backup application 114 that the snapshot has been successfully created. Backup application 114 can then do whatever is desired with the snapshot (e.g. copy it to tape).

Figure 4:
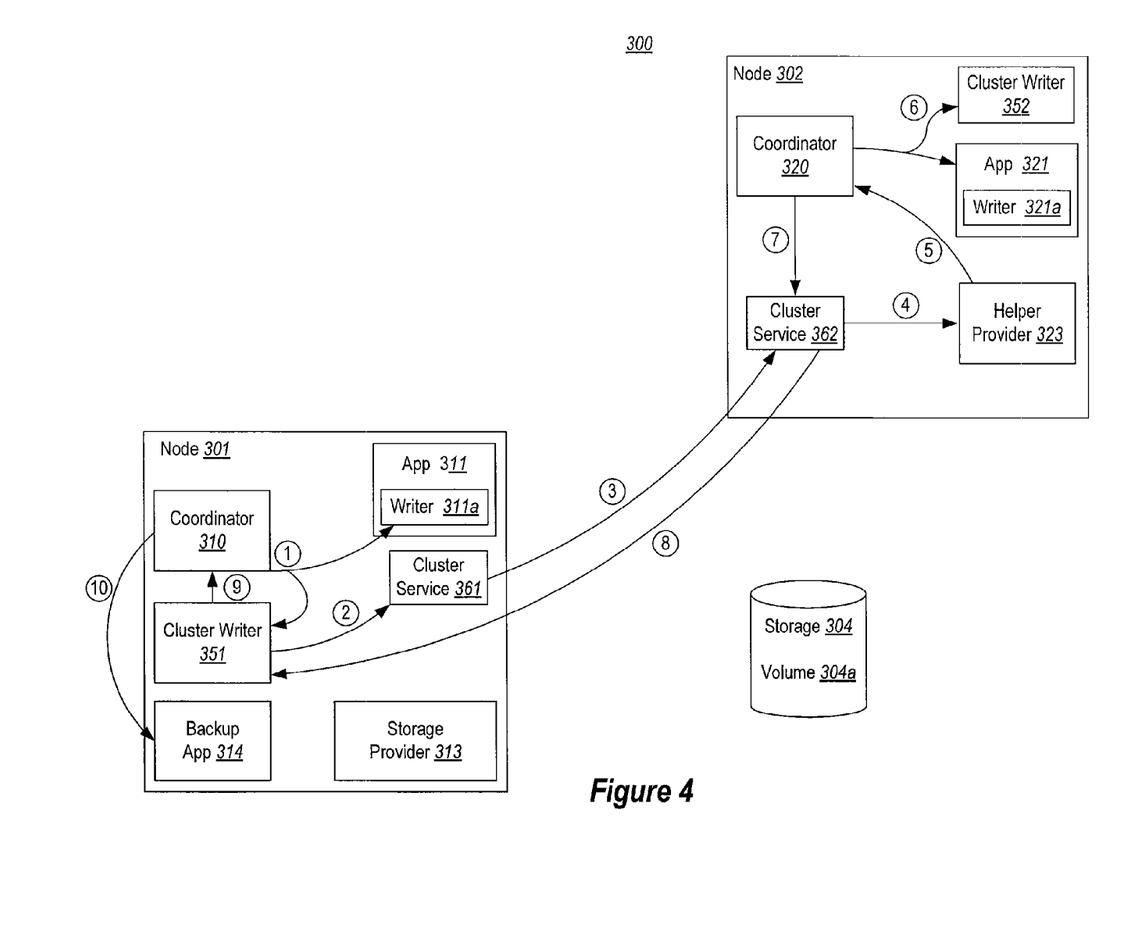
FIG. 4 illustrates an exemplary cluster of nodes showing another sequence of communications during the backup process.

FIG. 4, like FIG. 3, depicts cluster 300 and will be referred to to better describe the steps of performing post snapshot processing. The following numbered steps can be performed after steps 1-13 of FIG. 3 have been performed.

(1) Coordinator 310 sends a post snapshot command to writer 311*a* and cluster writer 351. Writer 311*a* processes the post snapshot command and returns at some point.

(2) Cluster writer 351 notifies cluster service 361 of the post snapshot command and blocks.

(3) Cluster service 361 notifies cluster service 362 of the post snapshot command.

(4) Cluster service 362 notifies helper provider 323 that the post snapshot command was received by cluster writer 351 on node 301.

(5) Helper provider 323 returns from the commit command.

(6) Coordinator 320 sends a post snapshot command to writer 321*a* and cluster writer 352. Writer 321*a* processes the post snapshot command and returns at some point. Cluster writer 352 simply returns.

(7) Once each writer has returned from the post snapshot command, coordinator 320 notifies cluster service 362 (who requested the backup on node 302) that the snapshot is complete.

(8) Cluster service 362 notifies cluster writer 351 of the completion of the backup process on node 302.

(9) Cluster writer 351 returns from the post snapshot command.

(10) Coordinator 310 notifies backup application 314 that the snapshot has been successfully created.

As can be seen, by this process of using a cluster writer on one node to communicate the occurrence of freeze and post snapshot commands to cluster writers on other nodes, the writers on these other nodes are able to persist the data of the corresponding applications on these other nodes. The result is that the snapshot created on one node has application consistency, not only to the applications on the node on which the backup was initiated, but to all the applications, on any node in the cluster, that use the volume being backed up.

Further, this process enables the prior art backup system described in FIG. 1 to be used to create these cluster wide application consistent snapshots without having to modify the basic control flow of the backup system. In other words, the coordinators on each node do not need to be modified to implement the invention. The cluster writers and helper providers obscure, from the coordinators, the additional steps carried out to create the cluster wide application consistent snapshot (i.e. to the coordinator, the cluster writer appears to be a writer, and the helper provider appears to be a storage provider).

FIG. 5 illustrates a flow chart of an example method 500 for initiating the creation of a snapshot of a shared volume used by applications on multiple nodes in a cluster. Method 500 will be described with respect to cluster 200 of FIG. 2.

Method 500 includes an act 501 of receiving a request, from a backup application, at a backup coordinator on a first node. The request requests that a snapshot be created of a shared volume used by at least one application on the first node and by at least one application on at least one other node in the cluster. Each of the at least one application on the first node and on the at least one other node includes a writer. Each of the first node and the at least one other node also includes a cluster service and a cluster writer. For example, coordinator 110 can receive a request from backup application 114 that requests that a snapshot be created of volume 104a.

Method 500 includes an act 502 of sending, by the backup coordinator, a freeze command to the cluster writer and each writer on the first node. The freeze command instructs the cluster writer and each writer on the first node to persist application data to the shared volume. For example, coordinator 110 can send a freeze command to writers 111a and 112a as well as to cluster writer 201.

Method 500 includes an act 503 of sending, by the cluster writer on the first node, a notification of the freeze command to the cluster service on the first node. For example, cluster writer 201 can notify cluster service 204 of the freeze command.

Method 500 includes an act 504 of sending, by the cluster service on the first node, a notification of the freeze command to the cluster service on each of the at least one other node. The notification instructs the cluster service on each of the at least one other node to initiate a backup process of the shared volume on each of the at least one other node. For example, cluster service 204 can send a notification to cluster services 205 and 206.

Method 500 includes an act 505 of waiting, by the cluster writer on the first node, for a notification from the cluster service on each of the at least one other node prior to returning from the freeze command. The notification indicates that each writer on the corresponding node has persisted corresponding application data to the shared volume. For example, cluster writer 201 can block on the freeze command until cluster service 205 and cluster service 206 notify cluster writer 201 that writers 121a and 122a, and writers 131a and 132a respectively have persisted their corresponding application data to volume 104a.

Method 500 includes an act 506 of, upon receiving the notification from the cluster service on each of the at least one other node, returning, by the cluster writer on the first node, from the freeze command. For example, cluster writer 201 can return from the freeze command upon receiving the notification from cluster services 205 and 206.

Method 500 includes an act 507 of, upon the cluster writer on the first node returning from the freeze command, sending, by the backup coordinator, a request to the storage provider. The request causes the storage provider to create a snapshot of the shared volume, the snapshot having application consistency to each application on the first node and the at least one other node that uses the shared volume. For example, coordinator 110 can request that storage provider 113 create a snapshot of volume 104a.

FIG. 6 illustrates a flow chart of an example method 600 for responding to a notification that the creation of a snapshot of a shared volume has been initiated on another node of the cluster. Method 600 will be described with respect to cluster 200 of FIG. 2.

Method 600 includes an act 601 of receiving a notification, at a cluster service on the first node, that a backup process of a shared volume has been initiated on a second node in the cluster. The shared volume is used by at least one application on each of the first and second nodes. The notification is received from a cluster service on the second node and indicates that a freeze command was received by a cluster writer on the second node. For example, cluster service 205 can receive a notification from cluster service 204 indicating that cluster writer 201 received a freeze command, of a backup process, from coordinator 110.

Method 600 includes an act 602 of sending, by the cluster service on the first node, a request to a backup coordinator on the first node. The request requests that a snapshot be created of the shared volume. For example, cluster service 205 can send a request to coordinator 120 to request that a snapshot of volume 104a be created on node 102.

Method 600 includes an act 603 of sending, by the backup coordinator, a freeze command to a cluster writer and a writer of the at least one application on the first node. The freeze command instructs the cluster writer and the at least one writer to persist application data to the shared volume. For example, coordinator 120 can send a freeze command to writers 121a and 122a as well as to cluster writer 202.

Method 600 includes an act 604 of, after the cluster writer and the at least one writer return from the freeze command, sending, by the backup coordinator, a commit command to a helper provider on the first node. For example, coordinator 120 can send a commit command to helper provider 223.

Method 600 includes an act 605 of sending, by the helper provider on the first node, a notification of the commit command to the cluster service on the first node. The helper provider blocks on the commit command. For example, helper provider 223 can notify cluster service 205 of the commit command and then block.

Method 600 includes an act 606 of sending, by the cluster service on the first node, a notification to the cluster writer on the second node that the commit command has been received thus indicating that each writer on the first node has persisted the data of the corresponding application to the shared volume. For example, cluster service 205 can send a notification to cluster writer 201 indicating that writers 121a and 122a have persisted their application data to volume 104a.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a first node of a cluster, the first node including a backup application, a backup coordinator, at least one application, a storage provider, a cluster service, and a cluster writer, a method for creating a snapshot of a shared volume that has application consistency to applications on more than one node of the cluster that use the shared volume, the method comprising:

receiving a request, from a backup application, at a backup coordinator on a first node, the request requesting that a snapshot be created of a shared volume used by at least one application on the first node and by at least one application on at least one other node in the cluster, each of the at least one application on the first node and on the at least one other node including a writer, and wherein each of the first node and the at least one other node also includes a cluster writer and a cluster service;

sending, by the backup coordinator, a freeze command to the cluster writer and each writer on the first node, the freeze command instructing the cluster writer and each writer on the first node to persist application data to the shared volume;

sending, by the cluster writer on the first node, a notification of the freeze command to the cluster service on the first node;

sending, by the cluster service on the first node, a notification of the freeze command to the cluster service on each of the at least one other node, the notification instructing the cluster service on each of the at least one other node to initiate a backup process of the shared volume on each of the at least one other node;

waiting, by the cluster writer on the first node, for a notification from the cluster service on each of the at least one other node prior to returning from the freeze command, the notification indicating that each writer on the corresponding node has persisted corresponding application data to the shared volume;

upon receiving the notification from the cluster service on each of the at least one other node, returning, by the cluster writer on the first node, from the freeze command; and upon the cluster writer on the first node returning from the freeze command, sending, by the backup coordinator, a request to the storage provider, the request causing the storage provider to create a snapshot of the shared volume, the snapshot having application consistency to each application on the first node and the at least one other node that uses the shared volume.

2. The method of claim 1, further comprising:
prior to sending the request to the storage provider causing the storage provider to create a snapshot of the shared volume, sending, by the backup coordinator, a flush and hold command to the shared volume thus causing the shared volume to persist file system metadata.

3. The method of claim 1, further comprising:
after the snapshot is created, sending, by the backup coordinator, a post snapshot command to the cluster writer and at least one of the writers on the first node; and
sending, by the cluster writer on the first node, a notification of the post snapshot command to the cluster service on the first node; and
sending, by the cluster service on the first node, a notification of the post snapshot command to the cluster service on each of the at least one other node.

4. The method of claim 3, wherein the at least one of the writers on the first node that is sent the post snapshot command comprises a writer of a hypervisor application.

5. The method of claim 3, further comprising:
waiting, by the cluster writer on the first node, for a notification from the cluster service on each of the at least one other node, the notification indicating that the backup process has been completed on each of the at least one other node; and
receiving, by the cluster writer on the first node, the notification that the backup process has been completed from the cluster service on each of the at least one other node.

6. The method of claim 5, further comprising:
after receiving the notification that the backup process has been completed from the cluster service on each of the at least one other node, returning, by the cluster writer on the first node, from the post snapshot command.

7. The method of claim 6, further comprising:
after the cluster writer and the at least one writer on the first node return from the post snapshot command, the backup coordinator notifying the backup application that the snapshot has been successfully completed.

8. At a node of a cluster, the node including a backup coordinator, at least one application, a helper provider, a cluster service, and a cluster writer, a method for responding to the notification that a backup process of a shared volume has been initiated on another node of the cluster, the method comprising:

receiving a notification, at a cluster service on the first node, that a backup process of a shared volume has been initiated on a second node in the cluster, the shared volume being used by at least one application on each of the first and second nodes, the notification being received from a cluster service on the second node and indicating that a freeze command was received by a cluster writer on the second node;

sending, by the cluster service on the first node, a request to a backup coordinator on the first node, the request requesting that a snapshot be created of the shared volume;

sending, by the backup coordinator, a freeze command to a cluster writer and a writer of the at least one application on the first node, the freeze command instructing the cluster writer and the at least one writer to persist application data to the shared volume;

after the cluster writer and the at least one writer return from the freeze command, sending, by the backup coordinator, a commit command to a helper provider on the first node;

sending, by the helper provider on the first node, a notification of the commit command to the cluster service on the first node, wherein the helper provider blocks on the commit command; and sending, by the cluster service on the first node, a notification to the cluster writer on the second node that the commit command has been received thus indicating that each writer on the first node has persisted the data of the corresponding application to the shared volume.

9. The method of claim 8, wherein the request sent by the cluster service on the first node that a snapshot be created of the shared volume specifies that the helper writer is to be used to create the snapshot.

10. The method of claim 8, further comprising:
receiving, by the cluster service on the first node, a notification from the cluster service on the second node that a post snapshot command has been received by the cluster writer on the second node.

11. The method of claim 10, further comprising:
sending, by the cluster service on the first node, a notification to the helper provider that the post snapshot command was received by the cluster writer on the second node.

12. The method of claim 11, further comprising:
returning, by the helper provider, from the commit command.

13. The method of claim 12, further comprising:
receiving, by the cluster writer and the at least one writer on the first node, a post snapshot command; and
performing, by the at least one writer, post processing on a virtual snapshot.

14. The method of claim 13, further comprising:
after the cluster writer and the at least one writer on the first node return from the post snapshot command, the backup coordinator notifying the cluster service on the first node that the snapshot has been successfully created on the first node; and in response to the notification, the cluster service on the first node notifying the cluster writer on the second node that the snapshot was successfully completed on the first node thus indicating to the cluster writer on the second node that each of the at least one writer processed the post snapshot command on the first node.

15. The method of claim 14, further comprising:
the cluster writer on the first node deleting the virtual snapshot on the first node.

16. The method of claim 14, wherein the virtual snapshot is exposed as a shared volume on the first node.

17. A cluster of nodes comprising:
a first node that includes a backup application, a backup coordinator, a plurality of applications, a cluster service, a cluster writer, and a storage provider, wherein each of the plurality of applications includes a writer for coordinating the creation of a snapshot with the backup coordinator;
at least one other node, each of the at least one other nodes including a backup coordinator, a plurality of applications, a cluster service, a cluster writer, and a helper provider, wherein each of the plurality of applications includes a writer for coordinating the creation of a snapshot with the backup coordinator;
wherein the cluster writer on the first node is configured to block on a freeze command from the backup coordinator on the first node and notify the cluster service on the first node which then notifies the cluster service on each of the at least one other node of the freeze command; and
wherein the cluster service on each of the at least one other node is configured to initiate the creation of a snapshot with the backup coordinator on the at least one other node in response to the notification of the freeze command from the cluster service on the first node.

18. The cluster of nodes of claim 17, wherein the helper provider on each of the at least one other node is configured to block on a commit command and notify the cluster service on the corresponding node of the commit command;
wherein the cluster service on the corresponding node is configured to notify the cluster writer on the first node of the commit command; and
wherein the cluster writer on the first node is configured to return from the freeze command upon receiving notification of the commit command from the cluster service on each of the at least one other node.

19. The cluster of nodes of claim 18, wherein the cluster writer on the first node is further configured to block on a post snapshot command from the backup coordinator on the first node and notify the cluster service on the first node which then notifies the cluster service on each of the at least one other node of the post snapshot command; and
wherein the cluster service on each of the at least one other node is configured to notify the helper provider on the corresponding node of the post snapshot command on the first node; and
wherein the helper provider on each of the at least one other node is configured to return from the commit command upon being notified of the post snapshot command on the first node.

20. The cluster of nodes of claim 19, wherein the cluster service on each of the at least one other node is configured to notify the cluster writer on the first node upon receiving a notification from the backup coordinator on the corresponding node that the snapshot has been successfully created on the corresponding node; and
wherein the cluster writer on the first node is configured to return from the post snapshot command upon receiving notification from the cluster service on each of the at least one other node that the snapshot was successfully created on the corresponding node.

\* \* \* \* \*